US008463593B2

(12) United States Patent
Pell et al.

(10) Patent No.: US 8,463,593 B2
(45) Date of Patent: Jun. 11, 2013

(54) NATURAL LANGUAGE HYPERNYM WEIGHTING FOR WORD SENSE DISAMBIGUATION

(75) Inventors: Barney Pell, San Francisco, CA (US);
Rion Snow, San Francisco, CA (US);
Scott A. Waterman, Campbell, CA (US)

(73) Assignee: Microsoft Corporation, Redmond, WA (US)

( * ) Notice: Subject to any disclaimer, the term of this patent is extended or adjusted under 35 U.S.C. 154(b) by 1019 days.

(21) Appl. No.: 12/201,015

(22) Filed: Aug. 29, 2008

(65) Prior Publication Data

US 2009/0089047 A1 Apr. 2, 2009

Related U.S. Application Data

(60) Provisional application No. 60/969,451, filed on Aug. 31, 2007, provisional application No. 60/969,486, filed on Aug. 31, 2007.

(51) Int. Cl.
*G06F 17/27* (2006.01)
*G06F 17/30* (2006.01)

(52) U.S. Cl.
USPC .............................................. 704/9; 707/711

(58) Field of Classification Search
None
See application file for complete search history.

(56) References Cited

U.S. PATENT DOCUMENTS

| 4,876,643 | A | 10/1989 | McNeill et al. |
| 5,267,156 | A * | 11/1993 | Nomiyama ..................... 704/10 |
| 5,519,608 | A | 5/1996 | Kupiec |
| 5,530,939 | A | 6/1996 | Mansfield, Jr et al. |
| 5,696,962 | A | 12/1997 | Kupiec |
| 5,933,822 | A | 8/1999 | Braden-Harder et al. |
| 6,076,051 | A * | 6/2000 | Messerly et al. .................. 704/9 |
| 6,161,084 | A * | 12/2000 | Messerly et al. .................. 704/9 |
| 6,185,592 | B1 | 2/2001 | Boguraev et al. |
| 6,189,002 | B1 | 2/2001 | Roitblat |
| 6,243,670 | B1 | 6/2001 | Bessho et al. |

(Continued)

FOREIGN PATENT DOCUMENTS

| CN | 1606004 | 4/2005 |
| CN | 1658188 | 5/2005 |

(Continued)

OTHER PUBLICATIONS

International Search Report dated Mar. 26, 2009 in International Application No. PCT/US2008/074935.

(Continued)

*Primary Examiner* — Brian Albertalli
(74) *Attorney, Agent, or Firm* — Hope Baldauff, LLC (57) ABSTRACT

Technologies are described herein for probabilistically assigning weights to word senses and hypernyms of a word. The weights can be used in natural language processing applications such as information indexing and querying. A word hypernym weight (WHW) score can be determined by summing word sense probabilities of word senses from which the hypernym is inherited. WHW scores can be used to prune away hypernyms prior to indexing, to rank query results, and for other functions related to information indexing and querying. A semantic search technique can use WHW scores to retrieve an entry related to a word from an index in response to matching an indexed hypernym of the word with a query term applied to the index. More refined and accurate query results may be provided based on reduced user inputs.

18 Claims, 6 Drawing Sheets

U.S. PATENT DOCUMENTS

| | | | |
|---|---|---|---|
| 6,246,977 B1 | 6/2001 | Messerly et al. | |
| 6,269,368 B1 | 7/2001 | Diamond | |
| 6,366,908 B1 | 4/2002 | Chong et al. | |
| 6,374,209 B1 | 4/2002 | Yoshimi et al. | |
| 6,654,740 B2 | 11/2003 | Tokuda et al. | |
| 6,675,159 B1* | 1/2004 | Lin et al. | 1/1 |
| 6,678,677 B2 | 1/2004 | Roux et al. | |
| 6,678,686 B1 | 1/2004 | Patel et al. | |
| 6,741,981 B2 | 5/2004 | McGreevy | |
| 6,766,316 B2 | 7/2004 | Caudill et al. | |
| 6,766,320 B1 | 7/2004 | Wang et al. | |
| 6,795,820 B2 | 9/2004 | Barnett | |
| 6,823,301 B1 | 11/2004 | Ishikura | |
| 6,842,730 B1 | 1/2005 | Ejerhed et al. | |
| 6,871,199 B1 | 3/2005 | Binnig et al. | |
| 6,901,399 B1 | 5/2005 | Corston | |
| 6,947,923 B2 | 9/2005 | Cha et al. | |
| 6,968,332 B1 | 11/2005 | Milic-Frayling | |
| 7,016,828 B1 | 3/2006 | Coyne et al. | |
| 7,027,974 B1 | 4/2006 | Busch et al. | |
| 7,031,910 B2 | 4/2006 | Eisele | |
| 7,035,789 B2 | 4/2006 | Abrego et al. | |
| 7,120,574 B2 | 10/2006 | Troyanova et al. | |
| 7,139,752 B2* | 11/2006 | Broder et al. | 1/1 |
| 7,171,349 B1 | 1/2007 | Wakefield et al. | |
| 7,184,950 B2 | 2/2007 | Weise | |
| 7,194,406 B2 | 3/2007 | Ejerhed et al. | |
| 7,225,121 B2 | 5/2007 | Maxwell et al. | |
| 7,249,012 B2* | 7/2007 | Moore | 704/4 |
| 7,269,594 B2 | 9/2007 | Corston-Oliver | |
| 7,319,951 B2 | 1/2008 | Rising et al. | |
| 7,346,490 B2 | 3/2008 | Fass | |
| 7,389,224 B1 | 6/2008 | Elworthy | |
| 7,398,201 B2 | 7/2008 | Marchisio | |
| 7,401,077 B2 | 7/2008 | Bobrow et al. | |
| 7,403,938 B2 | 7/2008 | Harrison et al. | |
| 7,593,845 B2 | 9/2009 | Ramsey | |
| 2002/0091684 A1 | 7/2002 | Nomiyama et al. | |
| 2002/0188586 A1 | 12/2002 | Veale | |
| 2003/0126136 A1* | 7/2003 | Omoigui | 707/10 |
| 2003/0233224 A1 | 12/2003 | Marchisio et al. | |
| 2004/0059736 A1* | 3/2004 | Willse et al. | 707/100 |
| 2004/0098247 A1* | 5/2004 | Moore | 704/4 |
| 2004/0103090 A1 | 5/2004 | Dogl et al. | |
| 2004/0243554 A1 | 12/2004 | Broder et al. | |
| 2004/0243556 A1 | 12/2004 | Ferrucci et al. | |
| 2004/0249795 A1 | 12/2004 | Brockway | |
| 2005/0043936 A1 | 2/2005 | Corston-Oliver et al. | |
| 2005/0065777 A1 | 3/2005 | Dolan et al. | |
| 2005/0071150 A1 | 3/2005 | Nasypny | |
| 2005/0080613 A1* | 4/2005 | Colledge et al. | 704/9 |
| 2005/0108001 A1 | 5/2005 | Aarskog | |
| 2005/0108630 A1 | 5/2005 | Wasson et al. | |
| 2005/0182617 A1 | 8/2005 | Reynar et al. | |
| 2005/0182619 A1 | 8/2005 | Azara | |
| 2005/0267871 A1 | 12/2005 | Marchisio et al. | |
| 2005/0283474 A1 | 12/2005 | Francis et al. | |
| 2006/0047632 A1 | 3/2006 | Zhang | |
| 2006/0156222 A1 | 7/2006 | Chi et al. | |
| 2006/0161534 A1 | 7/2006 | Carson, Jr. et al. | |
| 2006/0184517 A1 | 8/2006 | Anderson | |
| 2006/0224582 A1 | 10/2006 | Hogue | |
| 2006/0271353 A1 | 11/2006 | Berkan et al. | |
| 2007/0073533 A1 | 3/2007 | Thione et al. | |
| 2007/0073745 A1 | 3/2007 | Scott | |
| 2007/0143098 A1 | 6/2007 | Van der Berg | |
| 2007/0156393 A1 | 7/2007 | Todhunter et al. | |
| 2008/0015842 A1* | 1/2008 | Moore | 704/4 |
| 2008/0033982 A1 | 2/2008 | Parikh | |
| 2008/0086498 A1 | 4/2008 | Sureka | |
| 2008/0120279 A1 | 5/2008 | Xue | |
| 2008/0172628 A1 | 7/2008 | Mehrotra | |
| 2009/0019038 A1 | 1/2009 | Millett | |
| 2009/0094019 A1* | 4/2009 | Snow et al. | 704/9 |
| 2009/0271179 A1 | 10/2009 | Marchisio et al. | |
| 2010/0106706 A1 | 4/2010 | Rorex | |
| 2011/0301941 A1* | 12/2011 | De Vocht | 704/9 |

FOREIGN PATENT DOCUMENTS

| | | |
|---|---|---|
| EP | 0597630 | 5/1994 |
| KR | 10-0546743 | 4/2005 |
| WO | WO 02/067145 | 8/2002 |

OTHER PUBLICATIONS

Bontcheva et al., "Shallow Methods for Named Entity Coreference Resolution," Proceedings of the TALN 2002 Workshop. Nancy, France. Jun. 24-27, 2002, 9 pages.

Ng, Vincent "Shallow Semantics for Coreference Resolution," Proceedings of the Twentieth International Joint Conference on Artificial Intelligence (IJCAI), Hyderabad, India, Jan. 2007, pp. 1689-1694.

Duchier, Denys,"Constraint Programming for Natural Language Processing", retrieved at <<http://citeseerx.ist.psu.edu/viewdoc./download;jsessionid=F70461C9F31A4EB405543CE688CCBF3D?doi=10.1.1.10.3152&rep=rep1&type=pdf>>, 2000. pp. 1-94.

"Powerset, Natural Language Search Engine", retrieved at <<http://googlesystem.blogspot.com/2007/02/powerset-natural-language-search-engine.html>>, Feb. 9, 2007. pp. 1-3.

Chien, Lee-Feng,"Fast and Quasi-Natural Language Search for Gigabytes of Chinese Texts", retrieved at <<http:// delivery.acm.org/10.1145/220000/215345/p112-chien.pdf? key1=215345&key2=4667021221&coll=GUIDE&dl=GUIDE&CFID=2506110&CFTOKEN=93982745>>, 1995. pp. 1-9.

Kolodner Janet L.,"Indexing and Retrieval Strategies for Natural Language Fact Retrieval", retrieved z, retrieved at <<http://delivery.acm.org/10.1145/320000/319995/p434-kolodner.pdf?key1=319995&key2=1457021221&coll=GUIDE&dl=GUIDE&CFID=2551390&CFTOKEN=71366194>>, ACM Transactions on Database Systems, vol. 8, No. 3, Sep. 1983. pp. 1-31.

Thione, et al., "Applying Term Occurrence constraints in natural language search", U.S Appl. No. 60/969,406, filed Aug. 31, 2007.

Walters, et al., "Flexible Ranking infrastructure for query execution", U.S. No. 60/969,410, filed Aug. 31, 2007.

Walters, et al., "Checkpointing of composable lazily-evaluated integrators in search", U.S. Appl. 60/969,417, filed Aug. 31, 2007.

Thione, et al., "Indexing of alias cluster for search", U.S. Appl. No. 60/969,426, filed Aug. 31, 2007.

Crouch, et al., "Aboutness identification and indexing", U.S. Appl. No. 60/969,434, filed Aug. 31, 2007.

Polanyi, et al., "Valence calculus for indexing with special reference to reported speech and thought", U.S. Appl. No. 60/969,442, filed Aug. 31, 2007.

Snow, et al., "Bucketized threshold for runtime pruning of senses/ranking", U.S. Appl. No. 60/969,447, filed Aug. 31, 2007.

Pell, et al., "Hierarchal probability-based weighting for hypernyms in word sense disambiguation", U.S. Appl. No. 60/969,451, filed Aug. 31, 2007.

Biewald, et al., "Priority-based ranking functions for information retrieval", U.S. Appl. No. 60/969,453, filed Date Aug. 31, 2007.

Pell, et al.,"Priority-based disjunctive retrieval", U.S. Appl. No. 60/969,457, filed Aug. 31, 2007.

Rayner, et al., "Semi-automatic example-based induction of semantic translation rules to support natural language search", U.S. Appl. No. 60/969,472, filed Aug. 31, 2007.

Thione, et al., "Semantically-based highlighting of search results", U.S. Appl. No. 60/969,478, filed Aug. 31, 2007.

Salvetti, et al., "Integration of coreference resolution in and ambiguity-sensitive netural language processing pipeline for a search platform", U.S. Appl. No. 60/969,483, filed Aug. 31, 2007.

Thione, et al., "Fact-based indexing for natural language search", U.S. Appl. No. 60/969,486, filed Aug. 31, 2007.

Thione, et al., "Attribute-value mapping to map structural information about entities to ontologies", U.S. Appl. No. 60/969,488, filed Aug. 31, 2007.

Thione, et al., "Indexing and ranking role hierarchies search index", U.S. Appl. No. 60/969,490, filed Aug. 31, 2007.

Thione, et al., "Efficient posting layout for retrieval of terms in dominance hierarchies", U.S. Appl. No. 60/969,495, filed Aug. 31, 2007.

Salvetti, et al., "A system for browsing knowledge on the basis of semantic relations", U.S. Appl. No. 60/971,061, filed Sep. 10, 2007.

U.S. Official Action dated Jun. 22, 2011 in U.S. Appl. No. 12/201,596.
International Search Report dated Apr. 29, 2009 in International Application No. PCT. No. PCT/US08/074981.
U.S. Official Action dated Jan. 3, 2011 in U.S. Appl. No. 12/201,596.
Jun et al., "Keyfact-Based Information Retrieval System", TaeJon, Korea, downloaded Mar. 18, 2011 from http://www.dl.slis.tsukuba.ac.jp/ISDL97/proceedings/miseon/miseon.html, 6 pages.
Tablan et al., "A Natural Language Query Interface to Structured Information", downloaded Mar. 18, 2011 from http://www.eswc2008.org/final-pdfs-for-web-site/onl-2.pdf, 15 pages.
U.S. Notice of Allowance dated Apr. 5, 2012 in U.S. Appl. No. 12/201,504.
U.S. Notice of Allowance dated May 14, 2012 in U.S. Appl. No. 12/201,721.
U.S. Official Action dated Jan. 4, 2012 in U.S. Appl. No. 12/201,978.
U.S. Official Action dated Aug. 8, 2012 in U.S. Appl. No. 12/201,978.
International Search Report dated Mar. 31, 2009 in International Application No. PCT/US08/074938.
International Search Report dated Jan. 23, 2009 in International Application No. PCT/US08/074978.
International Search Report dated Mar. 31, 2009 in International Application No. PCT/US08/074984.
International Search Report dated Mar. 31, 2009 in International Application No. PCT/US08/074987.
European Search Report dated Oct. 5, 2011 in European Application No. 08799054.5.
U.S. Official Action dated Mar. 17, 2011 in U.S. Appl. No. 12/201,504.
U.S. Official Action dated Oct. 12, 2011 in U.S. Appl. No. 12/201,504.
U.S. Official Action dated Jan. 25, 2011 in U.S. Appl. No. 12/201,675.
U.S. Official Action dated Apr. 14, 2011 in U.S. Appl. No. 12/201,675.
U.S. Official Action dated Oct. 3, 2011 in U.S. Appl. No. 12/201,675.
U.S. Official Action dated Mar. 15, 2011 in U.S. Appl. No. 12/201,721.
U.S. Official Action dated Oct. 26, 2011 in U.S. Appl. No. 12/201,721.
U.S. Official Action dated Dec. 23, 2010 in U.S. Appl. No. 12/201,978.
U.S. Official Action dated Jun. 7, 2011 in U.S. Appl. No. 12/201,978.
Agichtein, et al., "Snowball: Extracting Relations from Large Plain-Text Collections," Dec. 1999, Columbia University Computer Science Dept. Technical Report CUCS-033-99, 13 pp.
Alesso, "Semantic Search Methods," downloaded Aug. 28, 2008 from hltp://microsoft.apress.com/asptodayarchiveI73985/semantic-search-methods, 14 pages.
Araghi, "Users Satisfaction through Belzer Indexing," 2005, Cataloging & Classification Quarterly, 40(2): 5-12. 9 pp.
CS474 Intro to Natural Language Processing: Question Answering, downloaded Dec. 12, 2011 from http://www.cs.cornell.edu/courses/cs474/2005fa/Handouts/advanced-qa.pdf, 8 pgs.

Debrauwer et al., "Semantic Searching and Text Analysis with Distinguo®," downloaded Dec. 12, 2011 from http://www.ultralingua.com/ul/en/dox/Distinguo-White-Paper.pdf, 6 pp.
Hakia—Meaning-based Search Engine for a Better Search, downloaded Aug. 28, 2008 from http://www.techiequest.com/hakia-meaning-based-search-engine-for-a-bettr-search/, 8 pgs.
Han et al, "A Study on the Conceptual Modeling and Implementation of a Semantic Search System," Mar. 2008, Korea Intelligent Information Systems Society, 14(1): 67-84.
Huibers, "Towards an Axiomatic Aboutness Theory for Information Retrieval," 1998, Information Retrieval: Uncertainty and Logics—Advanced Models for the Representation and Retrieval of Information. Kluwer Academic Publishers, 7 pp.
Hussam et al., "Semantic Highlighting on the WWW: Educational Implications," Nov. 1998, Proceedings of the WebNet 98 World Conference on the WWW, Internet and Intranet, 6 pp.
Hutchins, "On the problem of 'Aboutness' in Document Analysis," Apr. 1977, Journal of Informatics, 1(1): 17-35. 16 pp.
Kang, et al., "Document Indexing: A Concept-Based Approach to Term Weight Estimation," 2005, Information Processing and Management, 41:1065-1080, 16 pp.
Kapoor et al., "STAR: A System for Tuple and Attribute Ranking of Query Answer" Apr. 15, 2007, International Conference on Data Engineering 2007,2 pp.
Lo et al., "Using Semantic Relations with World Knowledge for Question Answering," 2006, Proceedings of the 15th Text Retrieval Conference (TREC 15), 6 pp.
Manegold et al., A multi-query optimizer for Monet, Jan. 31, 2000, Information Systems, 18 pgs.
Moens et al., " Measuring Aboutness of an Entity in a Text," 2006, Proceedings of the 1st Workshop on Graph Based Methods for Natural Language Processing, 4 pp.
Seki, Y., "Answer Extraction System by Question Type from Query Biased Summary for Newspaper Articles," Sep. 2001-Oct. 2002, Proceedings of the 3rd NTCIR Workshop, 8 pp.
Sieg et al., "Learning Ontology-based User Profiles: A Semantic Approach to Personalized Web Search," Nov. 2007, IEEE Intelligent Informatics Bulletin, 8(1): 7-18. 12pp.
Smeaton et al., "Experiments on Using Semantic Distances between Words in Images Caption Retrieval," Aug. 1996, Proceedings of the 19th Annual International ACM SIGIR Conference on Research and Development in Information Retrieval, 8 pp.
Srihari et al., "Information Extraction Supported Question Answering," Oct. 15, 1999, downloaded from http://handle.dtic.mi1/100.2/ADA460042, 12 pgs.
Taibi, et al., "A Semantic Search Engine for Learning Resources," 2005, Recent Research Developments in Learning Technologies, http://www.formatex.org/micte2005/349.pdf, 5 pp.
Vintar et al., "Semantic Relations in Concept-Based Cross-Language Medical Information Retrieval," Sep. 22, 2003, Proceedings of the ECML / PKDD Workshop on Adaptive Text Extraction and Mining, 9 pp.

* cited by examiner

NATURAL LANGUAGE HYPERNYM WEIGHTING FOR WORD SENSE DISAMBIGUATION

CROSS-REFERENCE TO RELATED APPLICATIONS

This application claims the benefit of U.S. provisional patent application No. 60/969,451, filed on Aug. 31, 2007, entitled "Hierarchal Probability-Based Weighting for Hypernyms in Word Sense Disambiguation," and U.S. provisional patent application No. 60/969,486, filed on Aug. 31, 2007, entitled "Fact-Based Indexing for Natural Language Search," both of which are expressly incorporated herein by reference in their entireties.

BACKGROUND

A word or phrase can often be associated with more than one possible meaning. These meanings may be referred to as senses of the word, or word sense. A natural language processing system can treat a word according to one or more of its word senses. A word sense can have one or more hypernyms. A hypernym generally has a broader, or more generic, meaning than its hyponym. For example "blue" is a hypernym for senses of the words "navy," "aqua," and "cyan." Also, "color" is a hypernym for a sense of the word "blue." Thus, "blue" is a hyponym of "color." In addition to multiple senses of a word, a natural language processing system can treat a word according to one or more of the hypernyms of the sense of the word.

Unfortunately, processing every word in terms of all of the word senses and hypernyms associated with the word can generate a considerable increase in complexity and resource requirements. Techniques for word sense disambiguation (WSD) attempt to reduce ambiguity between the senses of a word. Thus, WSD techniques may also reduce complexity and resource requirements within a natural language processing system.

In an information search application, a search index entry can be created for every sense of a word encountered in the content to be indexed for search. Similarly, a search index entry can be created for every hypernym of every sense of a word encountered in the content to be indexed for search. Either, or both, of these indexing approaches can introduce, to the search index, the considerable computational impact discussed above. Thus, the search index can become inefficient or unreasonable to manage. Moreover, increased complexity may be incurred during a query of the search index due to additional word senses to be processed.

It is with respect to these considerations and others that the disclosure made herein is presented.

SUMMARY

Technologies are described herein related to natural language hypernym weighting for word sense disambiguation. In particular, techniques for probabilistically assigning weights to word senses and hypernyms of a word for use in natural language processing applications such as information indexing and querying are described. Relative weights can be assigned to word senses of a given word. Such word sense weighting (WSW) can assign scores to be used for determining probable meanings, or senses, and thus support word sense disambiguation (WSD). A word hypernym weight (WHW) score can be provided by assigning weights based upon the level of overlap across senses for hypernyms of the word.

Once established, WHW scores can be leveraged through various techniques in information searching, such as pruning away hypernyms prior to indexing, ranking query results, and so forth. For example, a semantic search technique can leverage WHW scores to match general concepts (hypernyms) in a query to more concrete expressions of these concepts (hyponyms) that have been indexed from corpus text. Leveraging WHW scores can significantly improve precision, recall, and ranking in a wide variety of natural language processing applications including information search. In addition to assigning weights to individual word senses, weights may be assigned to one or more related concepts, or facts, within the semantic index.

According to one aspect presented herein, WSW values, WHW values, or both can be established for WSD functionality within a semantic processing framework. WHW scores can be assigned by determining word senses and hypernyms for a given word followed by analyzing probabilities associated with the word senses and relative overlap between the hypernyms of the word senses.

According to another aspect presented herein, WSW scores and WHW scores can be used to prune out possible but unlikely word senses prior to indexing. This pruning can support word sense disambiguation and reduce the considerable complexity impact associated with processing an entire un-pruned set of hypernyms.

According to yet another aspect presented herein, WHW or WSW scores can be used for ranking search results. Information retrieved from a semantic index for information searching can be presented in a hierarchical and user-intelligible ordering. As such, a more refined and accurate query, requiring a reduced amount of user input, can be provided. Support may be provided for a user to select, filter, refine, and re-rank retrieved information according to the WSW or WHW scores.

According to yet another aspect presented herein, a heuristic function can be used to assess the relative value of a hypernym and cost to process and store the additional hypernym. The heuristic can suggest modifying the weight of a given hypernym or removing the hypernym from consideration. Optimized tradeoffs between language processing quality (e.g. recall and precision) and system performance (e.g. computational time, space, and complexity) can be supported.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies related to natural language hypernym weighting for word sense disambiguation. Through the use of the technologies and concepts presented herein, probabilistically assigned weights for word sense and hypernyms of a word can be used in natural language processing applications such as information indexing and querying.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for natural language hypernym weighting and word sense disambiguation are described.

Figure 1:
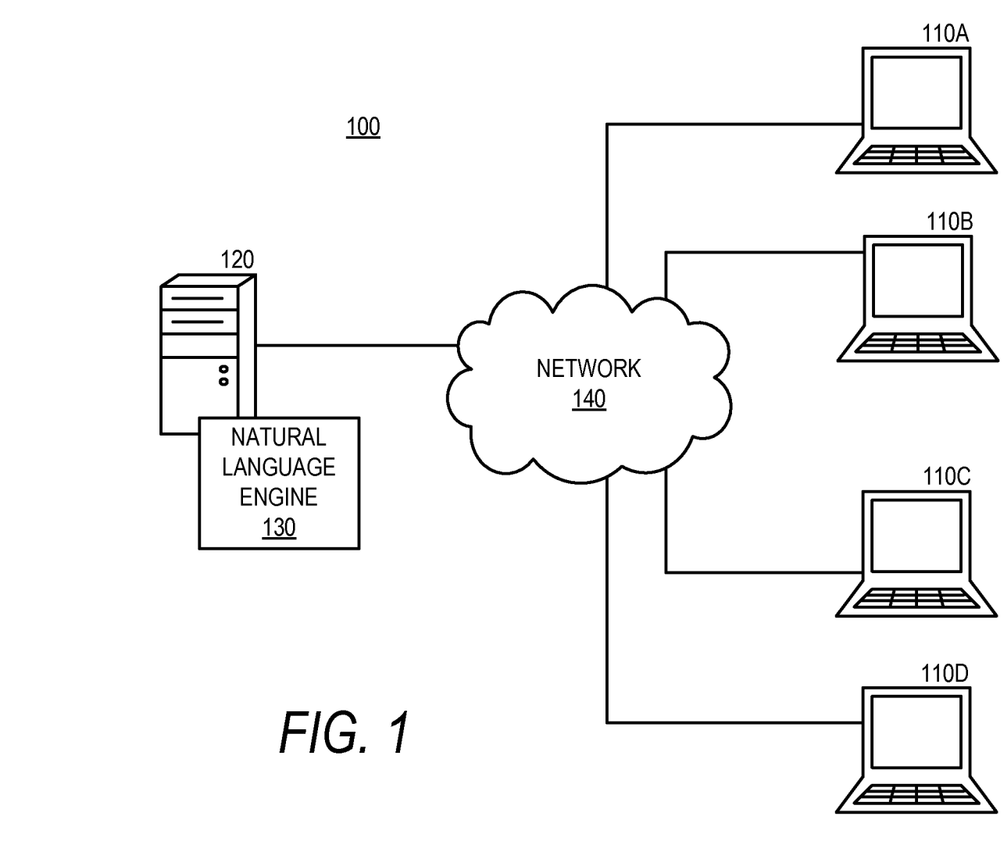
FIG. 1 is a network architecture diagram illustrating an information search system according to aspects of an embodiment presented herein.

Turning now to FIG. 1, details will be provided regarding an illustrative operating environment for the implementations presented herein. In particular, a network architecture diagram 100 illustrates an information search system according to aspects of an embodiment presented herein. Client computers 110A-110D can interface through a network 140 to a server 120 to obtain information associated with a natural language engine 130. While four client computers 110A-110D are illustrated, it should be appreciated that any number of client computers 110A-110D may be in use. The client computers 110A-110D may be geographically distributed across a network 140, collocated, or any combination thereof. While a single server 120 is illustrated, it should be appreciated that the functionality of the server 120 may be distributed over any number of multiple servers 120. Such multiple servers 120 may be collocated, geographically distributed across a network 140, or any combination thereof.

According to one or more embodiments, the natural language engine 130 may support search engine functionality. In a search engine scenario, a user query may be issued from a client computer 110A-110D through the network 140 and on to the server 120. The user query may be in a natural language format. At the server, the natural language engine 130 may process the natural language query to support a search based upon syntax and semantics extracted from the natural language query. Results of such a search may be provided from the server 120 through the network 140 back to the client computers 110A-110D.

One or more search indexes may be stored at, or in association with, the server 120. Information in a search index may be populated from a set of source information, or a corpus. For example, in a web search implementation, content may be collected and indexed from various web sites on various web servers (not illustrated) across the network 140. Such collection and indexing may be performed by software executing on the server 120, or on another computer (not illustrated). The collection may be performed by web crawlers or spider applications. The natural language engine 130 may be applied to the collected information such that natural language content collected from the corpus may be indexed based on syntax and semantics extracted by the natural language engine 130. Indexing and searching is discussed in further detail with respect to FIG. 2.

The client computers 110A-110D may act as terminal clients, hypertext browser clients, graphical display clients, or other networked clients to the server 120. For example, a web browser application at the client computers 110A-110D may support interfacing with a web server application at the server 120. Such a browser may use controls, plug-ins, or applets to support interfacing to the server 120. The client computers 110A-110D can also use other customized programs, applications, or modules to interface with the server 120. The client computers 110A-110D can be desktop computers, laptops, handhelds, mobile terminals, mobile telephones, television set-top boxes, kiosks, servers, terminals, thin-clients, or any other computerized devices.

The network 140 may be any communications network capable of supporting communications between the client computers 110A-110D and the server 120. The network 140 may be wired, wireless, optical, radio, packet switched, circuit switched, or any combination thereof. The network 140 may use any topology, and links of the network 140 may support any networking technology, protocol, or bandwidth such as Ethernet, DSL, cable modem, ATM, SONET, MPLS, PSTN, POTS modem, PONS, HFC, satellite, ISDN, WiFi, WiMax, mobile cellular, any combination thereof, or any other data interconnection or networking mechanism. The network 140 may be an intranet, an internet, the Internet, the World Wide Web, a LAN, a WAN, a MAN, or any other network for interconnection computers systems.

It should be appreciated that, in addition to the illustrated network environment, the natural language engine 130 can be operated locally. For example, a server 120 and a client computer 110A-110D may be combined onto a single computing device. Such a combined system can support search indexes stored locally or remotely.

Figure 2:
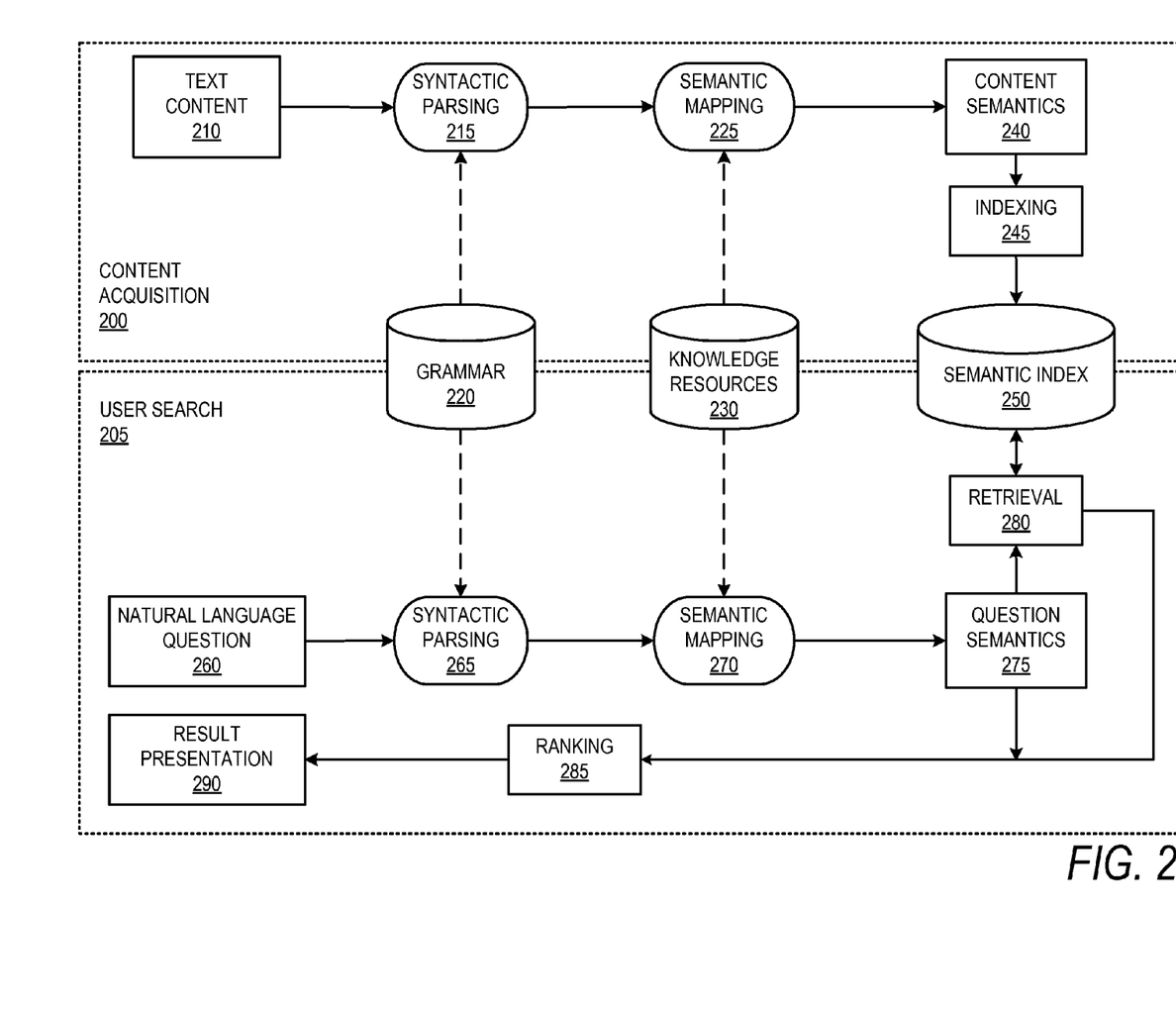
FIG. 2 is a functional block diagram illustrating various components of a natural language index and query system according to aspects of an embodiment presented herein.

Referring now to FIG. 2, a functional block diagram illustrates various components of a natural language engine 130 according to one exemplary embodiment. As discussed above, the natural language engine 130 can support information searches. In order to support such searches, a content acquisition process 200 is performed. Operations related to content acquisition 200 extract information from documents provided as text content 210. This information can be stored in a semantic index 250 that can be used for searching. Operations related to a user search 205 can support processing of a user entered search query. The user query can take the form of a natural language question 260. The natural language engine 130 can analyze the user input to translate a query into a representation to be compared with information represented within the semantic index 250. The content and structuring of information in the semantic index 250 can support rapid matching and retrieval of documents, or portions of documents, that are relevant to the meaning of the query or natural language question 260.

The text content 210 may comprise documents in a very general sense. Examples of such documents can include web pages, textual documents, scanned documents, databases, information listings, other Internet content, or any other information source. This text content 210 can provide a corpus of information to be searched. Processing the text content 210 can occur in two stages as syntactic parsing 215 and semantic mapping 225. Preliminary language processing steps may occur before, or at the beginning of parsing 215. For example, the text content 210 may be separated at sentence boundaries. Proper nouns may be identified as the names of particular people, places, objects or events. Also, the grammatical properties of meaningful word endings may be determined. For example, in English, a noun ending in "s" is likely to be a plural noun, while a verb ending in "s" may be a third person singular verb.

Parsing 215 may be performed by a syntactic analysis system such as the Xerox Linguistic Environment (XLE). The parser 215 can convert sentences to representations that make explicit the syntactic relations among words. The parser 215 can apply a grammar 220 associated with the specific language in use. For example, the parser 215 can apply a grammar 220 for English. The grammar 220 may be formalized, for example, as a lexical functional grammar (LFG). The grammar 220 can specify possible ways for constructing meaningful sentences in a given language. The parser 215 may apply the rules of the grammar 220 to the strings of the text content 210.

A grammar 220 may be provided for various languages. For example, LFG grammars have been created for English, French, German, Chinese, and Japanese. Other grammars may be provided as well. A grammar 220 may be developed by manual acquisition where grammatical rules are defined by a linguist or dictionary writer. Alternatively, machine learning acquisition can involve the automated observation and analysis of many examples of text from a large corpus to automatically determine grammatical rules. A combination of manual definition and machine learning may be also be used in acquiring the rules of a grammar 220.

The parser 215 can apply the grammar 220 to the text content 210 to determine constituent structures (c-structures) and functional structures (f-structures). The c-structure can represent a hierarchy of constituent phrases and words. The f-structure can encode roles and relationships between the various constituents of the c-structure. The f-structure can also represent information derived from the forms of the words. For example, the plurality of a noun or the tense of a verb may be specified in the f-structure.

During a semantic mapping process 225 that follows the parsing process 215, information can be extracted from the f-structures and combined with information about the meanings of the words in the sentence. A semantic map or semantic representation of a sentence can be provided as content semantics 240. Semantic mapping 225 can augment the syntactic relationships provided by the parser 215 with conceptual properties of individual words. The results can be transformed into representations of the meaning of sentences from the text content 210. Semantic mapping 225 can determine roles played by words in a sentence. For example, the subject performing an action, something used to carry out the action, or something being affected by the action. For the purposes of search indexing, words can be stored in a semantic index 250 along with their roles. Thus, retrieval from the semantic index 250 can depend not merely on a word in isolation, but also on the meaning of the word in the sentences in which it appears within the text content 210. Semantic mapping 225 can support disambiguation of terms, determination of antecedent relationships, and expansion of terms by synonym, hypernym, or hyponym.

Semantic mapping 225 can apply knowledge resources 230 as rules and techniques for extracting semantics from sentences. The knowledge resources can be acquired through both manual definition and machine learning, as discussed with respect to acquisition of grammars 220. The semantic mapping 225 process can provide content semantics 240 in a semantic extensible markup language (semantic XML or semxml) representation. Content semantics 240 can specify roles played by words in the sentences of the text content 210. The content semantics 240 can be provided to an indexing process 245.

An index can support representing a large corpus of information so that the locations of words and phrases can be rapidly identified within the index. A traditional search engine may use keywords as search terms such that the index maps from keywords specified by a user to articles or documents where those keywords appear. The semantic index 250 can represent the semantic meanings of words in addition to the words themselves. Semantic relationships can be assigned to words during both content acquisition 200 and user search 205. Queries against the semantic index 250 can be based on not only words, but words in specific roles. The roles are those played by the word in the sentence or phrase as stored in the semantic index 250. The semantic index 250 can be considered an inverted index that is a rapidly searchable database whose entries are semantic words (i.e. word in a given role) with pointers to the documents, or web pages, on which those words occur. The semantic index 250 can support hybrid indexing. Such hybrid indexing can combine features and functions of both keyword indexing and semantic indexing.

User entry of queries can be supported in the form of natural language questions 260. The query can be analyzed through a natural language pipeline similar, or identical, to that used in content acquisition 200. That is, the natural language question 260 can be processed by a parser 265 to extract syntactic structure. Following syntactic parsing 265, the natural language question 260 can be processed for semantic mapping 270. The semantic mapping 270 can provide question semantics 275 to be used in a retrieval process 280 against the semantic index 250 as discussed above. The retrieval process 280 can support hybrid index queries where both keyword index retrieval and semantic index retrieval may be provided alone or in combination.

In response to a user query, results of retrieval 280 from the semantic index 250 along with the question semantics 275 can inform a ranking process 285. Ranking can leverage both keyword and semantic information. During ranking 285, the results obtained by retrieval 280 can be ordered by various metrics in an attempt to place the most desirable results closer to the top of the retrieved information to be provided to the user as a result presentation 290.

Figure 3:
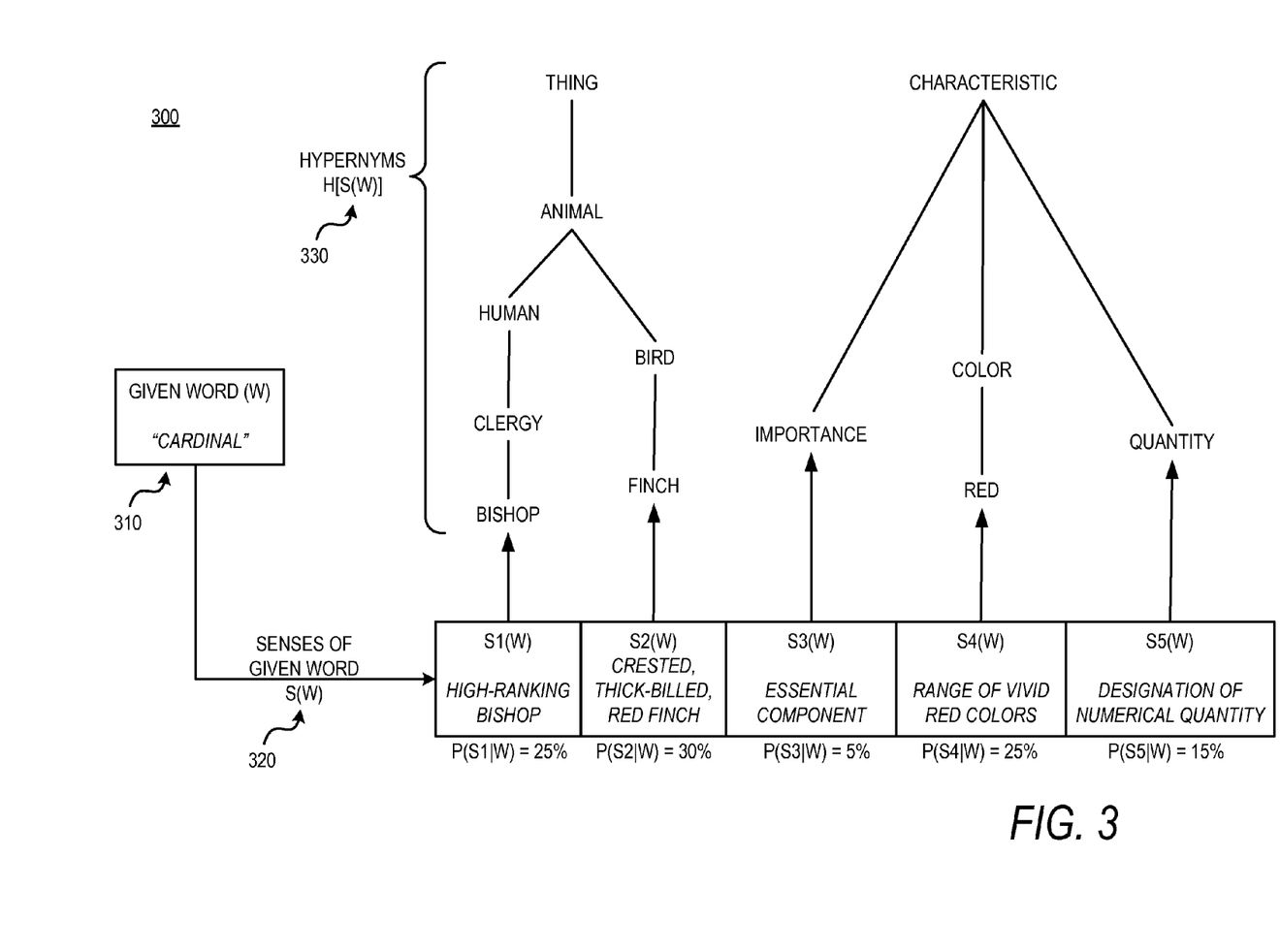
FIG. 3 is a semantic relationship diagram illustrating word senses and hypernym inheritance for a given word according to aspects of an embodiment presented herein.

Turning now to FIG. 3, a semantic relationship diagram 300 will be described that illustrates word senses 320 and hypernym inheritance for a given word 310 according to aspects of an embodiment presented herein. For an example given word 310 of "cardinal," several word senses 320 may be determined. Five example word senses 320 of the given word 310 "cardinal" are illustrated as $S_1(W)$-$S_5(W)$ or collectively as S(W). Five word senses S(W) 320 of the word "cardinal" may be specified as $S_1(W)$ a high-ranking bishop; $S_2(W)$ a crested, thick-billed, red finch; $S_3(W)$ an essential component; $S_4(W)$ a range of vivid red colors; and $S_5(W)$ a designation of numerical quantity.

Hypernyms 330 of the word senses 320 can be denoted as H[S(W)]. As illustrated, hypernyms 330 can be structured as a hierarchy of inherited hypernyms 330. For example, sense one $S_1(W)$ for the word "cardinal" can have the hypernym 330 "bishop." The hypernym 330 "bishop" can have the hypernym 330 "clergy." The hypernym 330 "clergy" can have the hypernym "human."

Similarly, sense two $S_2(W)$ for the word "cardinal" can have the hypernym 330 "finch." The hypernym 330 "finch" can have the hypernym 330 "bird." Both the hypernym 330 "bird" of sense two $S_2(W)$ and the hypernym 330 "human" of sense one $S_1(W)$ can have, as a hypernym 330, the word "animal" which can then itself have the hypernym 330 "thing." Thus, a tree-like inheritance hierarchy can be established for the hypernyms 330 of the word senses 320 associated with the given word 310.

Hypernyms 330 associated with word senses 320 and word senses 320 associated with a dictionary of given words 310 can be provided as a knowledge resource 230 within a natural language processing system. A lexical resource, such as WORDNET, may be used as a knowledge resource 230. Such a knowledge resource 230 component can provide a set of concepts, meanings, or senses for a given word 310. These may be referred to as synsets, or semantically equivalent synonyms, of the given word 310. The knowledge resource 230 component can also provide a set of, or hierarchy of, hypernyms 330 for each sense, meaning, or synset. Each hypernym 330 may also be considered a synset associated with the given word 310.

Within a natural language processing system, the processing of hypernyms 330 associated with word senses 320 and word senses 320 associated with a given word 310 can provide a generalized meaning, or meanings, to the given word 310. For example, a reference to a cardinal object may relate to red objects as well as objects that are more specifically cardinal in color. Literal keyword processing of the word "cardinal" may not provide the additional reference to red objects.

In an example system supporting indexed information search using natural language processing, a given word 310 can be added to a semantic index 250 along with multiple word senses 320 and hypernyms 330 related to the given word 310. Such indexing can support retrieving specific hyponyms to general queries. For example, a search query related to birds may retrieve an indexed document related to cardinals or finches even though the document may not literally contain the keyword "bird." However, indexing multiple word senses 320 or hypernyms 330 related to a given word 310 to be indexed can significantly increase complexity, time, and storage requirements. Although these increases can lead to considerable computational impact, WSW and WHW scores can be used to weight the likelihood of hypernyms 330. Such weighting can be used to reduce the focus of lowly weighted hypernyms 330, or to remove, or prune, lowly weighted hypernyms 330.

Weighting of word senses 320 or hypernyms 330 can also improve search results where a hypernym 330 may relate to a limited subset of word senses 320, or to low likelihood word senses 320, of a given word 310. For other, unrelated, word senses indexing by the hypernym 330 may result to incorrect results. The weighting techniques can focus processing on hypernyms 330 based on the probability that a hypernym 330 would be appropriate to word senses 320 for a given word 310.

For each word sense 320 associated with a given word 310, a probability may be established as to the likelihood that a specific word is used as a particular word sense 320. For example, $p(S_1|W)$ in FIG. 3 is illustrated as 25 percent. According to the illustrated example, when the given word "cardinal" is encountered, there can be a 25 percent chance that the meaning of the word relates to word sense $S_1$ or "high-ranking bishop." As such, these probabilities can provide a WSW, or a weighting as to likelihood that a word is used in a particular sense.

One example for determining a word sense probability can be to divide a smoothing function for the word sense by the sum of the soothing functions for all of the senses of the word. Here, the smoothing function can be given as the observed frequency of a word sense plus one. In general, WSW or word sense probabilities may be considered probability estimates and may be based on observations of word sense frequencies.

Word sense probabilities can be used to establish weights for the hypernyms 330 also known as the WHW scores. An example of establishing WHW scores from word sense probabilities is given as:

$$WHW(H,W) = \Sigma p(S_n|W) f(H, S_n).$$

Where the WHW score of a hypernym 330 for a given word 310 is the sum, over word senses $S_n$, of the product of the probability of the sense $S_n$ of the given word W and the function $f(H, S_n)$. The function $f(H, S_n)$ can be defined as having a value of one when H is an inherited hypernym of the word sense $S_n$, and having the value of zero otherwise. According to this approach, in the illustrated example: WHW ("human", "cardinal")=25 percent; WHW("importance", "cardinal")=5 percent; WHW("animal", "cardinal")=55 percent; and WHW ("characteristic", "cardinal")=45 percent.

Figure 4:
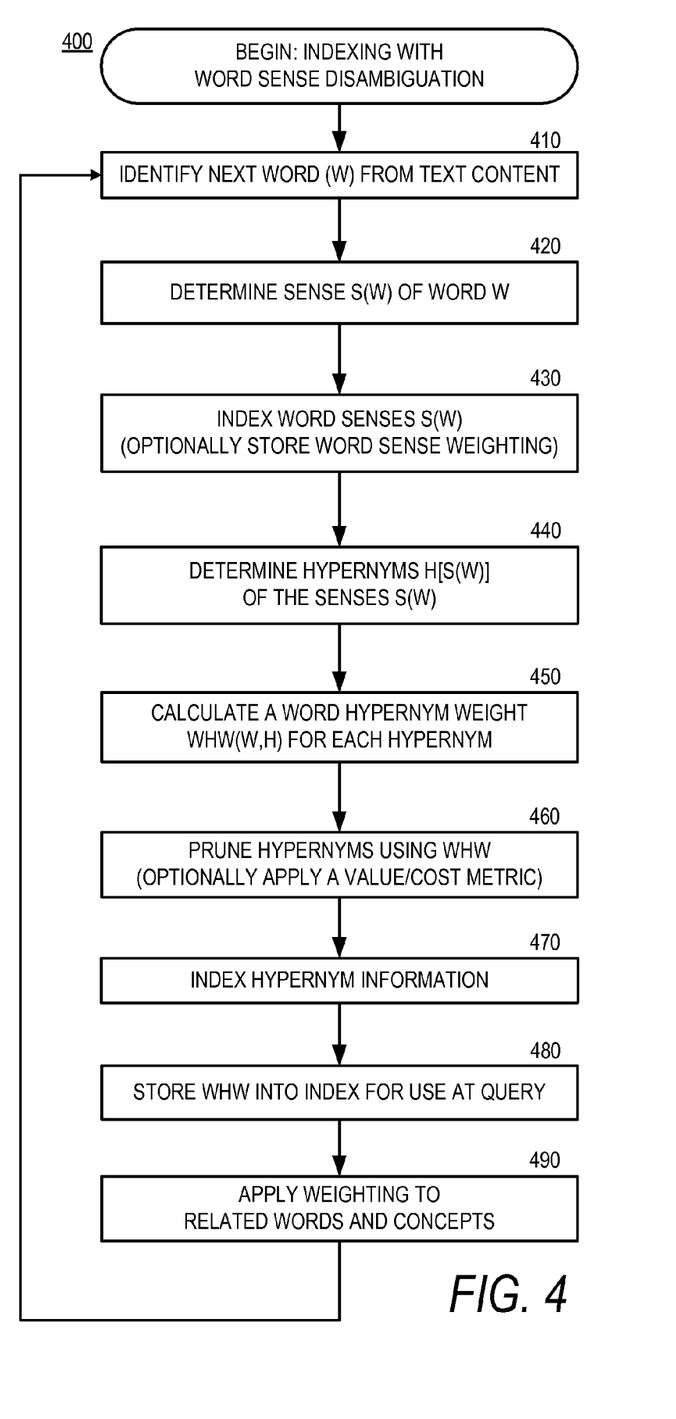
FIG. 4 is a logical flow diagram illustrating aspects of processes for indexing with word sense disambiguation according to aspects of an embodiment presented herein.

Referring now to FIG. 4, additional details will be provided regarding the embodiments presented herein for natural language hypernym weighting and word sense disambiguation. In particular, FIG. 4 is a flow diagram illustrating aspects of a process 400 for indexing with word sense disambiguation according to an embodiment presented herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

The routine 400 begins at operation 410, where the next given word 310 to be indexed is identified from text content 210. The text content 210 can be a set of documents, in a very general sense, such as web pages, books, articles, papers, files, any general source of information, and any combination thereof. At operation 420, one or more word senses S(W) 320 of the given word 310 can be determined from a knowledge resource 230 associated with a natural language processing system.

At operation 430, the word senses 320 determined in operation 420 can be stored to a semantic index 250. Optionally, WSW scores, or word sense weights can be stored into the semantic index 250 in association with the stored word senses 320.

At operation 440, hypernyms 330 can be determined. The hypernyms 330 can be associated with the word senses 320 determined in operation 420. At operation 450, WHW scores can be determined for the hypernyms 330 determined in operation 440. An example of determining WHW values can be to add up the WSW values, or probabilities of particular word senses 320, associated with word senses 320 for which the hypernym 330 is an inherited hypernym. Using such a technique, the hypernym H can be assigned a WHW score of 100 percent when all senses of a word generate the hypernym H. However, when one out of ten senses of a word generate hypernym H, and all the senses are equally likely, then the hypernym H receives a WHW score of ten percent. Similarly, if three out of ten word senses of a word generate hypernym H, and those senses have a combined probability of 50 percent, then the hypernym H receives a score of 50 percent. Using such an approach, WHW ("criticize", "say") may be 100 percent when all senses of "criticize" generate the hypernym "say." Similarly, WHW ("defend", "say") can be significantly less than 100 percent when the word "say" is not a hypernym of most senses of "defend." For example, to defend a goal or to defend a nation as a soldier may not involve a verbal defense invoking the hypernym "say."

At operation 460, the WHW scores of the hypernyms 330 of a given word 310 may be used to prune away the lower scoring hypernyms. The pruning threshold can be established as a specified value or as a function of various system parameters. For example, a value to cost ratio metric may be used in the hypernym pruning. Representing each additional sense or hypernym in a natural language system, or within the semantic index 250, can introduce added cost. For example, costs related to additional computational complexity, processing time, and storage space may be incurred. At the same time, added benefits may be realized by supporting additional senses or hypernyms. For example, improved recall or precision may be provided. A heuristic function that assesses the costs and value of a hypernym given its WHW score and other factors may be used to establish a value to cost ratio metric. Tradeoffs between quality (e.g. recall or precision) and performance (e.g. processing time, storage space, or computational complexity) can be supported.

At operation 470, information related to the hypernyms 330 determined in operation 440 can be stored into the semantic index 250. Such information can include the hypernyms 330 themselves, word senses of the hypernyms 330, synsets associated with the hypernyms, or any combination thereof. Hypernyms 330 that were pruned out at operation 460 can be excluded from storage within the semantic index 250.

At operation 480, WHW scores associated with the hypernyms stored in operation 470 may also be stored into the semantic index 250. The stored WHW scores can be tied, within the semantic index 250, to the indexed hypernyms 330. Storing WHW scores within the semantic index 350 can support retrieving the WHW scores from the index at query time and applying the WHW scores to post-retrieval processes, such as the ranking of outputs.

At operation 490, weight scores, such as WSW and WHW values, can be applied to concepts, facts, or other words related to the given word 310 being indexed. In some semantic applications, word sense weighting can be used for word senses corresponding to synonyms (synsets) of a given word, and also for relating one word to other words, facts, or concepts. In addition to assigning weights to word senses 320 and hypernyms 330, relational weights may be assigned to related concepts. After operation 490, the routine 400 can loop back to operation 410 to identify the next content word to be indexed.

Figure 5:
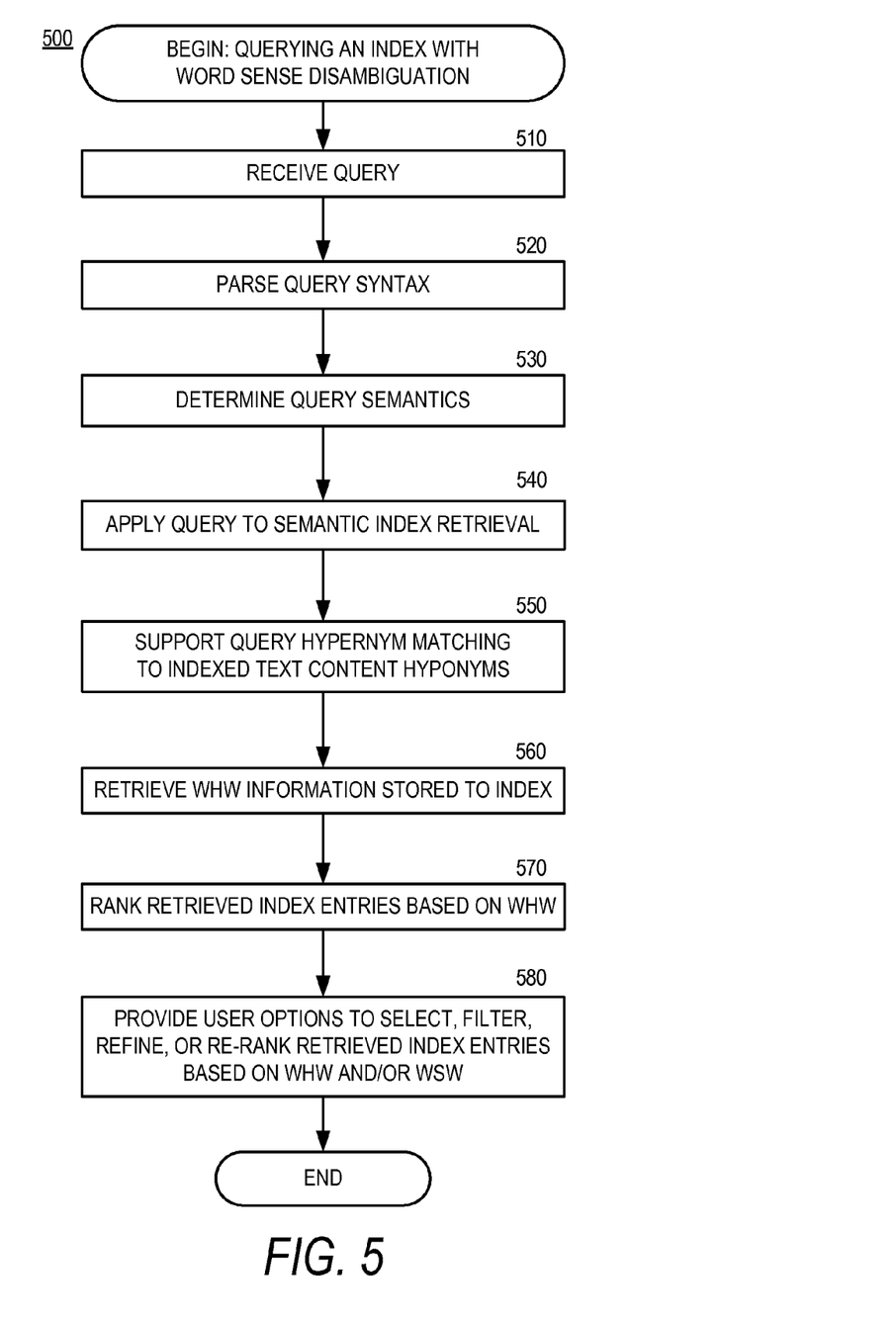
FIG. 5 is a logical flow diagram illustrating aspects of processes for querying an index with word sense disambiguation according to aspects of an embodiment presented herein.

Referring now to FIG. 5, additional details will be provided regarding the embodiments presented herein for natural language hypernym weighting and word sense disambiguation. In particular, FIG. 5 is a flow diagram illustrating aspects of a process 500 for querying an index with word sense disambiguation according to an embodiment presented herein. The routine 500 begins at operation 510, where a query can be received. For example, the query can be from a user requesting a search into a semantic index 250.

At operation 520, a syntactic parsing 265 can be performed on the query received in operation 510. The syntactic parsing 265 may use a stored grammar 220. At operation 530, a semantic mapping 270 can be established for the query received in operation 510. The semantic mapping 270 can use knowledge resources 230 and generate question semantics 275.

At operation 540, the question semantics 275 can be applied to a semantic index 250 to support search query retrieval 280. According to operation 550, the matching of hypernyms and hyponyms indexed into the semantic index 250 can be supported during retrieval 280. Since indexed words may have been expanded to also index associated hypernyms, as discussed with respect to FIGS. 3 and 4, index matching can support retrieval of documents or facts related by word sense, hypernym, or hyponym to words in the query as opposed to being limited to literal keyword matched retrieval.

At operation 560, WHW or WSW scores stored into the semantic index 250 at indexing time can be retrieved from the semantic index in response to retrieving the associated words, sense, or hypernyms. At operation 570, the weighting scores retrieved in operation 560 can be leveraged to rank the index entries retrieved in operation 540. For example, a retrieved index entry based upon a stored entry with a higher WHW score or a higher WSW score may be placed higher in the query results that are returned.

At operation 580, a user may be provided with options to select, filter, refine, or re-rank the retrieved index entries based on WHW or WSW scores. More refined and accurate query results based on reduced user inputs may be supported. After operation 580, the routine 500 can terminate.

Figure 6:
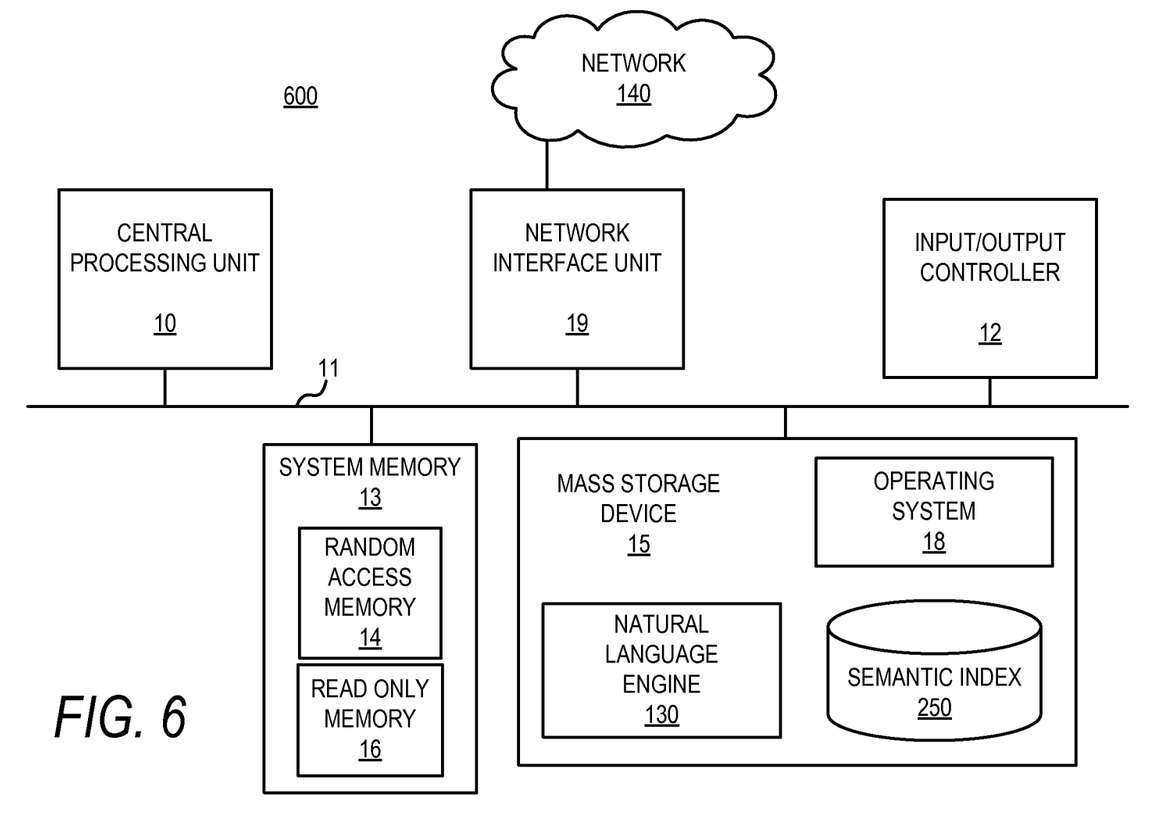
FIG. 6 is a computer architecture diagram showing an illustrative computer hardware and software architecture for a computing system capable of implementing aspects of an embodiment presented herein.

Turning now to FIG. 6, an illustrative computer architecture 600 can execute software components described herein for natural language hypernym weighting and word sense disambiguation. The computer architecture shown in FIG. 6 illustrates a conventional desktop, laptop, or server computer and may be utilized to execute any aspects of the software components presented herein. It should be appreciated however, that the described software components can also be executed on other example computing environments, such as mobile devices, television, set-top boxes, kiosks, vehicular information systems, mobile telephones, embedded systems, or otherwise. Any one, or more, of the client computers 110A-110D, and the server computer 120 associated with the natural language engine 130 may be implemented as computer system 600 according to embodiments.

The computer architecture illustrated in FIG. 6 can include a central processing unit 10 (CPU), a system memory 13, including a random access memory 14 (RAM) and a readonly memory 16 (ROM), and a system bus 11 that can couple the system memory 13 to the CPU 10. A basic input/output system containing the basic routines that help to transfer information between elements within the computer 600, such as during startup, can be stored in the ROM 16. The computer 600 may further include a mass storage device 15 for storing an operating system 18, software, data, and various program modules, such as those associated with the natural language engine 130. A server computer 120 can execute portions of software components described herein. A semantic index 250 associated with the natural language engine 130 may be stored on the mass storage device 15.

The mass storage device 15 can be connected to the CPU 10 through a mass storage controller (not illustrated) connected to the bus 11. The mass storage device 15 and its associated computer-readable media can provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 140. The computer 600 may connect to the network 140 through a network interface unit 19 connected to the bus 11. It should be appreciated that the network interface unit 19 may also be utilized to connect to other types of networks and remote computer systems. The computer 600 may also include an input/output controller 12 for receiving and processing input from a number of other devices, including a keyboard, mouse, or electronic stylus (not illustrated). Similarly, an input/output controller 12 may provide output to a video display, a printer, or other type of output device (also not illustrated).

As mentioned briefly above, a number of program modules and data files may be stored in the mass storage device 15 and RAM 14 of the computer 600, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the natural language engine 130 for execution by the CPU 10. The server computer 120 can include software components for implementing portions of the processes discussed in detail with respect to FIGS. 1-5. The mass storage device 15, the ROM 16, and the RAM 14 may also store other types of program modules. The mass storage device 15, the ROM 16, and the RAM 14 can also store, in part or in whole, a semantic index 250 associated with the natural language engine 130.

Based on the foregoing, it should be appreciated that technologies related to natural language hypernym weighting for word sense disambiguation are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for indexing information with word sense disambiguation, the method comprising:
   determining, by a computing device, a plurality of first word senses $S_n$ associated with a given word W;
   determining, by the computing device, a plurality of hypernyms $H_n$ associated with each of the plurality of first word senses $S_n$;
   establishing, by the computing device, a word hypernym weight $WHW(H_n,W)$ for each of the plurality of hypernyms $H_n$ based on $$WHW(H_n,W)=\Sigma p(S_n|W)f(H_n,S_n),$$

where the word hypernym weight $WHW(H_n,W)$ being equal to a sum, over the plurality of first word senses $S_n$, of the product of the probability p of the sense of the given word $S_n|W$ and a function $f(H_n,S_n)$ defined as having a value of one when a given hypernym H is an inherited hypernym of the plurality of word senses Sn, and having a value of zero otherwise;
   selecting, by the computing device, a hypernym $H_s$ from the plurality of hypernyms $H_n$ based on the word hypernym weight $WHW(H_n,W)$; and
   storing, by the computing device, a second word sense $S_s$ of the selected hypernym $H_s$ into a semantic index.

2. The method of claim 1, further comprising storing, by the computing device, the plurality of first word senses $S_n$ in the semantic index.

3. The method of claim 1, further comprising storing, by the computing device, the selected hypernym $H_s$ into the semantic index.

4. The method of claim 3, further comprising pruning, by the computing device, a hypernym of the plurality of hypernyms $H_n$ by applying a heuristic for cost to value ratio.

5. The method of claim 1, further comprising storing, by the computing device, the word hypernym weight $WHW(H_n, W)$ in the semantic index.

6. The method of claim 1, further comprising querying, by the computing device, the semantic index.

7. The method of claim 6, further comprising ranking, by the computing device, query results using the word hypernym weight $WHW(H_n,W)$.

8. The method of claim 6, further comprising retrieving, by the computing device, an entry related to the word from the semantic index in response to matching an indexed hypernym of the word with a query term applied to the semantic index.

9. The method of claim 6, further comprising providing support, by the computing device, for selecting or filtering query results based on the word hypernym weight WHW($H_n$, W).

10. A computer storage medium having computer executable instructions that are not a signal stored thereon which, when executed by a computer, cause the computer to:
identify a given word W to be entered into an index;
determine a plurality of word senses $S_n$ associated with the word W;
determine a plurality of hypernyms $H_n$ associated with the plurality of word senses $S_n$, the plurality of hypernyms $H_n$ comprising a tree-like inheritance hierarchy of hypernyms associated with each of the plurality of word senses $S_n$;
establish a word hypernym weight WHW($H_n$,W) for each of the plurality of hypernyms $H_n$ based on $$WHW(H_n,W)=\Sigma p(S_n|W)f(H_n,S_n)$$

where the word hypernym weight WHW($H_n$,W) being equal to a sum, over the plurality of word senses $S_n$, of the product of the probability p of the sense of given word $S_n$|W and a function f($H_n$,$S_n$) defined as having a value of one when a given hypernym H is an inherited hypernym of the plurality of word senses Sn, and having a value of zero otherwise; and store information associated with the hypernym H into the index based on the word hypernym weight WHW($H_n$,W).

11. The computer storage medium of claim 10, further causing the computer to store the plurality of word senses $S_n$ into the index.

12. The computer storage medium of claim 10, further causing the computer to prune hypernyms in response to the established word hypernym weight WHW($H_n$,W).

13. The computer storage medium of claim 10, further causing the computer to applying a heuristic for cost to value ratio to the hypernym.

14. The computer storage medium of claim 10, further causing the computer to store the word hypernym weight WHW($H_n$,W) into the index.

15. The computer storage medium of claim 10, further causing the computer to query the index.

16. The computer storage medium of claim 15, further causing the computer to rank query results using the word hypernym weight WHW($H_n$,W).

17. The computer storage medium of claim 15, further causing the computer to retrieve an entry related to the given word from the index in response to matching an indexed hypernym of the given word with a query term applied to the index.

18. A computer-implemented method for natural language indexing and query with word sense disambiguation, the method comprising:
identifying, by a computing device, a given word W to be stored into a semantic index;
determining, by the computing device, a first word sense S associated with the given word W;
determining, by the computing device, a hypernym H associated with the first word sense S;
establishing, by the computing device, a word hypernym weight WHW(H,W) for the hypernym H based on $$WHW(H_n,W)=\Sigma p(S_n|W)f(H_n,S_n),$$

where the word hypernym weight WHW($H_n$,W) being equal to a sum, over a plurality of word senses $S_n$, for the given word W, of the product of the probability p of the sense of the given word $S_n$|W and a function f($H_n$,$S_n$) defined as having a value of one when the hypernym H is an inherited hypernym of the plurality of word senses $S_n$, and having a value of zero otherwise;
pruning, by the computing device, hypernyms H based on the word hypernym weight WHW($H_n$,W);
determining, by the computing device, a second word sense $S_s$ associated with the hypernym H;
entering, by the computing device, the second word sense $S_s$ into the semantic index;
storing, by the computing device, the word hypernym weight WHW($H_n$,W) into the semantic index; and
retrieving, by the computing device, an entry related to the given word W from the index in response to matching an indexed hypernym of the word with a query term applied to the index.

* * * * *